United States Patent [19]

Roettgen et al.

[11] Patent Number: 4,565,177

[45] Date of Patent: Jan. 21, 1986

[54] UNITIZED CROSS TIE AFTERCOOLER ASSEMBLY

[75] Inventors: Leslie A. Roettgen, Columbus; Kenneth W. Israel, Hope, both of Ind.

[73] Assignee: Cummins Engine Company, Inc., Columbus, Ind.

[21] Appl. No.: 530,651

[22] Filed: Sep. 9, 1983

[51] Int. Cl.[4] .............................................. F02B 29/04
[52] U.S. Cl. ...................................... 123/563; 165/51; 165/162; 165/906
[58] Field of Search .......................... 60/599; 123/563; 165/162, 139, 176, DIG. 9, 51, 52

[56] References Cited

U.S. PATENT DOCUMENTS

| | | | |
|---|---|---|---|
| 2,068,739 | 1/1937 | Francisco et al. | 165/51 |
| 2,068,740 | 1/1937 | Francisco | 165/51 X |
| 2,346,463 | 4/1944 | Szekely | 123/563 |
| 3,091,228 | 5/1963 | Maxwell | 123/563 X |
| 3,881,455 | 5/1975 | Belsanti | 123/563 |
| 4,191,148 | 3/1980 | Patel et al. | 123/563 |
| 4,269,158 | 5/1981 | Berti | 123/563 |
| 4,303,052 | 12/1981 | Manfredo et al. | 123/563 |
| 4,436,145 | 3/1984 | Manfredo et al. | 123/563 |

OTHER PUBLICATIONS

"Engine Charge Air Cooler Nomenclature" SAE Recommended Practice J 1148 (Jun. 1976); 1982, SAE Handbook, vol. 2, pp. 24.130-24.132.

*Primary Examiner*—Michael Koczo
*Attorney, Agent, or Firm*—Sixbey, Friedman & Leedom

[57] ABSTRACT

An aftercooler housing (26) is made of lightweight sheet material which is assembled with an aftercooler core (44) so that the core (44) reinforces the housing. Housing (26) can be constructed from a sheet of suitable metal, plastic, fiberglass which extends around the core to provide an open ended configuration. End walls (36, 38) enclose the housing, and wall (36) supports both an air inlet port (24) as well as coolant fluid inlet and outlet ports (62, 64). Top wall (28) of the housing is tapered downwardly from wall (36) to wall (38) to provide a tapered air inlet chamber for the aftercooler. Reinforcing sections (58) are provided on the sidewall of the housing adjacent the engine, and cross tie members (72, 78) pass from the remaining sidewall of the housing through the housing to the reinforcing sections to transfer some of the load on the housing to the reinforcing sections.

4 Claims, 5 Drawing Figures

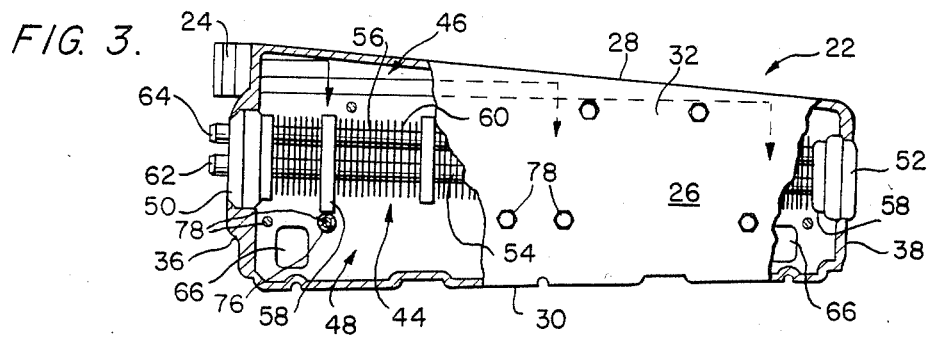
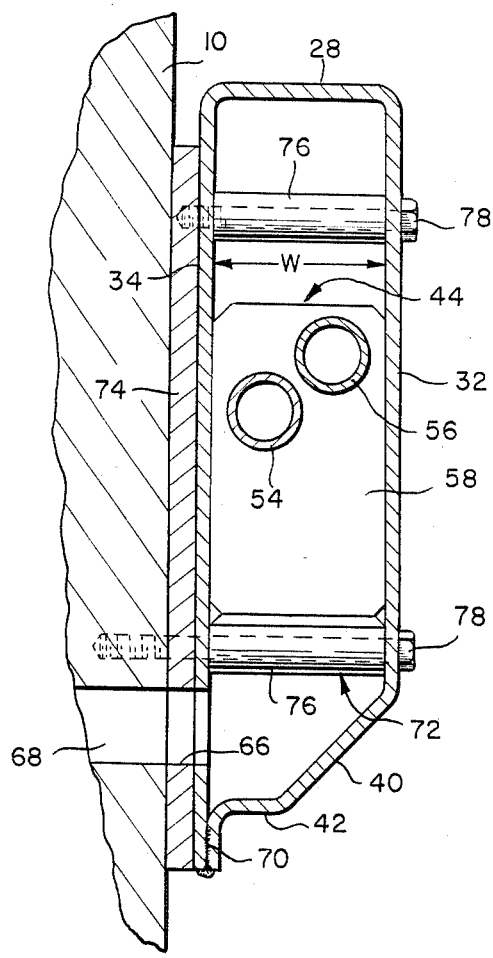
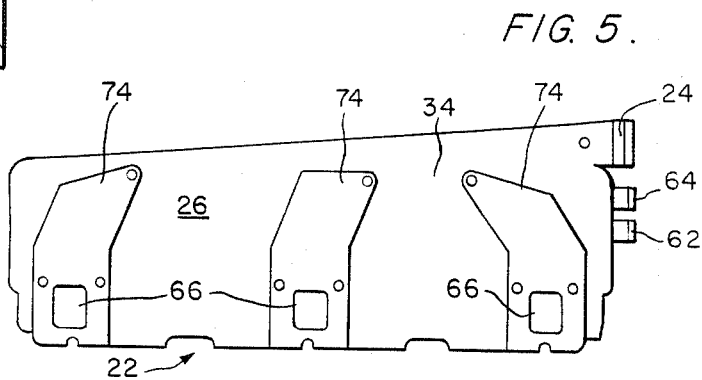

UNITIZED CROSS TIE AFTERCOOLER ASSEMBLY

DESCRIPTION

1. Technical Field

The present invention relates to aftercooler assemblies for internal combustion engines, and specifically to a unitized aftercooler assembly for turbocharged engines structured to provide a streamlined profile.

2. Background Art

It has long been conventional to increase the specific output of a supercharged or turbocharged engine by use of an aftercooler (or intercooler) assembly to cool the compressed air before it enters the engine cylinders for combustion. As air is compressed in an engine turbocharger, it becomes heated and therefore less dense for a given pressure, and therefore would provide a less effective air charge to support combustion in the cylinders of an internal combustion engine. Cooling of this turbocharged air after it has been compressed and before it enters the engine cylinders increases the air density, and consequently a greater amount of energy is generated upon combustion to increase the horsepower output of the engine.

Basically, an aftercooler constitutes a conventional heat exchanger having a housing which encloses a heat exchange core including tubes through which engine coolant passes. Compressed heated air from a turbocharger is then introduced into the housing and passes in heat exchange relationship with the core so that the compressed air is cooled before being passed to the engine manifold.

A number of aftercooler designs have been employed to effectively cool the compressed air passing from an engine turbocharger to the intake manifold for an engine. Such structures are shown by U.S. Pat. Nos. 3,881,455 to James F. Belsanti and 4,269,158 to Jerome L. Berti. Since such aftercoolers require large surface areas for the transmission of heat to the fluid cooling medium from the compressed air to be cooled, their use has increased the overall space requirement of an engine assembly. It has been conventional for an engine turbocharger to deliver pressurized air through a crossover duct extending across the top of the engine to the aftercooler assembly positioned on the opposite side of the engine, thereby substantially expanding the engine profile. Also, since the aftercooler assembly must withstand both the effects of highly pressurized air as well as engine and road vibrations without rupture or leakage, the housing for such assembly is normally a heavy cast housing which contributes to both the bulk and weight of the assembly with a corresponding increase in the engine size.

Attempts have been made to design aftercoolers in a manner so as to minimize the increase in engine size attributed by the aftercooler assembly. Such an aftercooler design is disclosed by U.S. Pat. No. 3,091,228 to Carl R. Maxwell wherein an aftercooler of minimum profile is provided along one side of an internal combustion engine. Although this aftercooler design is more effective than many known to the prior art, it still incorporates several potential structural problems. First, the effectiveness of this aftercooler is reduced by a compressed air entry passage which extends outwardly along substantially the entire extent of the aftercooler structure. With this air entry design, it is necessary to provide internal baffles or deflector vanes in the air intake section of the aftercooler to achieve proper air distribution over the cooling core. These baffle plates support the cooling core and are welded to the tube bundle, so that if the sidewalls of the aftercooler housing bulge when highly pressurized air is delivered thereto, the weld joints with the baffle plates may be broken. Also the baffle plates present a restriction to the free flow of air throughout the longitudinal extent of the aftercooler thereby inhibiting to some extent the even distribution of air.

Aftercooler assembly designed to correct the potential structural problems presented by a welded core support assembly is disclosed by U.S. Pat. No. 4,191,148 to Hershad H. Patel et al. This patent illustrates a simplifed aftercooler assembly wherein an elongated coolant tube bundle is supported by plates spaced between heat exchange fins to form an aftercooler core. Although this arrangement provides an improved support for the aftercooler core which structurally reinforces the aftercooler housing, a relatively bulky housing which increases the overall engine size is still employed.

DISCLOSURE OF THE INVENTION

It is the primary object of the present invention to provide a novel and improved unitized cross tie aftercooler assembly which includes a lightweight aftercooler housing with an aftercooler core positioned within the housing. The aftercooler housing is constructed from sheet material and is assembled with the aftercooler core in such a manner that the core reinforces the housing.

Another object of the present invention is to provide a novel and improved unitized cross tie aftercooler assembly for a turbocharged internal combustion engine wherein the air from the engine turbocharger which is to be cooled in the aftercooler is introduced through an inlet wall of the aftercooler. Additionally, the cooling fluid for the aftercooler core passes into and out through inlet and outlet ports positioned in the inlet wall of the aftercooler.

A further object of the present invention is to provide a novel and improved unitized cross tie aftercooler assembly having an air inlet section designed to provide effective air distribution without requiring the use of baffles or air directing vanes. Compressed air from a turbocharger is introduced into the aftercooler assembly through the inlet wall thereof in a direction substantially parallel to the longitudinal axis of the aftercooler assembly. The top wall of the aftercooler assembly which defines the top wall of the air inlet chamber for the assembly is inclined downwardly from the inlet wall toward the end wall of the assembly so as to intercept and redirect incoming air downwardly toward an aftercooler core without substantially inhibiting a free flow of air longitudinally of the aftercooler assembly.

Yet another object of the present invention is to provide a novel and improved unitized cross tie aftercooler assembly having a light housing of fabricated sheet material with reinforcing sections provided on one sidewall of the housing. Cross tie units pass from the remaining wall of the housing through to the reinforcing sections so as to sandwich the aftercooler core between the sidewalls of the housing and impart the core strength to the housing. Such cross tie units may include bolts which pass through the reinforcing sections and mount the aftercooler assembly on an engine.

Another object of the present invention is to provide a novel and improved unitized cross tie aftercooler assembly having a housing formed from fabricated sheet material. End caps are provided at either end of the housing to form the end walls thereof and to enclose an aftercooler core which extends centrally through the aftercooler housing.

A still further object of the present invention is to provide a novel and improved unitized cross tie aftercooler assembly having an enhanced design which may be economically constructed to provide a compact highly effective aftercooler.

These objects are accomplished by forming an aftercooler housing of lightweight sheet material which is assembled with an aftercooler core so that the core reinforces the housing. This aftercooler housing may be constructed from a sheet of suitable metal, plastic, fiberglass or other sheet material which is fabricated to extend around the core to provide an open ended configuration. End walls are then provided to enclose the housing, and an inlet end wall supports both an air inlet port as well as coolant fluid inlet and outlet ports. The top wall of the housing is tapered downwardly from the inlet wall to the remaining end wall thereof to provide a tapered air inlet chamber for the aftercooler. Reinforcing sections are provided on the sidewall of the housing adjacent the engine, and cross tie members pass from the remaining sidewall of the housing through the housing to the reinforcing sections to transfer some of the load on the housing to the reinforcing sections. This sandwiches the aftercooler core within the housing so that the housing walls are reinforced by the aftercooler core as well as the reinforcing sections, and a strong, unitized structure results.

BRIEF DESCRIPTION OF THE DRAWINGS

FIG. 3 is a partially sectioned view of the unitized cross tie aftercooler assembly of FIG. 2;

FIG. 4 is a cross sectional view of the unitized cross tie aftercooler assembly of FIG. 2; and FIG. 5 is a view in side elevation of the unitized cross tie aftercooler assembly showing a side opposite the side shown in FIG. 2.

BEST MODE FOR CARRYING OUT THE INVENTION

Figure 1:
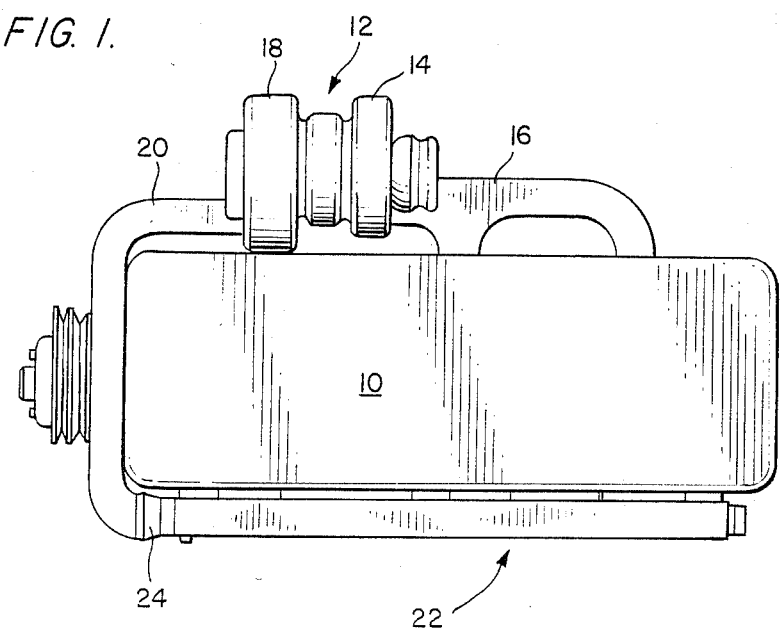
FIG. 1 is a diagrammatic plan view of a turbocharged engine provided with the unitized cross tie aftercooler assembly of the present invention.
Figure 2:
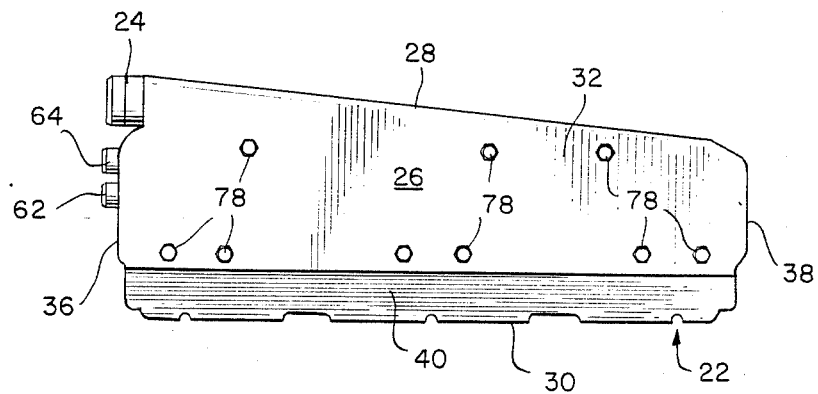
FIG. 2 is a view in side elevation of the unitized cross tie aftercooler assembly of the present invention showing a first side thereof.

Referring now to FIG. 1, a turbocharged internal combustion engine indicated generally at 10 includes a turbocharger 12 having a turbine 14 which is driven by gases from the engine exhaust manifold 16. The turbine 14 drives a compressor 18 to pressurize air for delivery through a duct 20 to the aftercooler of the present invention which is indicated generally at 22. It should be noted that the duct 20 is not a crossover duct which passes over the top of the engine 10 to the aftercooler 22 in a manner previously conventional to known turbocharger-aftercooler combinations, but instead, the duct 20 passes around the front of the engine 10.

Referring now to FIGS. 2-5, it will be noted that the aftercooler 22 includes a housing 26 having a top wall 28, a bottom wall 30, an outer sidewall 32, an inner sidewall 34, an inlet end wall 36 and a remaining end wall 38. The lower portion of the outer sidewall 32 angles toward the lower edge of the side wall 34 as indicated at 40 in FIGS. 2 and 4, and is connected to the side wall by a base or bottom wall 42.

The aftercooler housing 26 encloses an aftercooler core assembly indicated generally at 44 which centrally divides the aftercooler housing into an upper air distribution section 46 and a lower air outlet section 48. The aftercooler core includes a forward header 50 and and aft header 52 mounted adjacent the inlet wall 36 and the end wall 38 respectively of the aftercooler housing. Extending between the forward and aft headers are a plurality of elongated cooling fluid conducting conduits with two of such conduits being indicated at 54 and 56. Although only a fluid inlet conduit 54 and a fluid return conduit 56 have been illustrated in FIGS. 3 and 4, it is obvious that additional fluid conduits will be included in the aftercooler core assembly. The fluid conduits extend through openings in support plates 58 and are fixed to the support plates by brazing or other suitable means. These support plates extend across the extent of the aftercooler housing 26 and operate to both support the conduits 54 and 56 and reinforce the aftercooler housing. A plurality of relatively thin fins 60 of any suitable configuration extend across the conduits 54 and 56 to increase the heat exchange effect thereof.

It is obvious that other known core assemblies may be used in place of the assembly illustrated in FIG. 3. For example, the core may include sideplate support members which extend along either side of the fins 60 and support the core in place of the support plates 58. Also, the conduits 54 and 56 could be serpentine, helical or formed to a number of configurations other than the straight conduit configuration shown in FIG. 4.

Cooling fluid for the aftercooler core 44 is provided from the engine cooling system through an inlet port 62 to the forward header 50. This fluid then passes through the inlet conduit 54 to the aft header 52 and then back through the outlet conduit 56 and the forward header 50 to an outlet port 64 which is also connected into the engine cooling system. The forward header is internally divided in known manner between the inlet port 62 and the outlet port 64 so that the inlet and outlet fluids therein are maintained in separate sections of the header.

It is noteworthy that the air inlet port 24 and the coolant inlet port 62 and outlet port 64 are all positioned on the inlet end wall of the aftercooler 22. This inlet end wall could be positioned adjacent either end of the engine 10, but is normally positioned adjacent the front of the engine to simplify the connection of the aftercooler to the engine. The position of the air inlet port in combination with the configuration of the air inlet chamber 46 also operates to provide a simple but effective air distribution system for the aftercooler assembly. Previously known aftercooler assemblies which receive air from a crossover duct extending over the engine to the top of the aftercooler have employed various baffles and air directing vanes within the aftercooler to evenly distribute air across the aftercooler core. The necessity for these air distribution baffles is eliminated in the aftercooler of this invention, for the air inlet port at one end of the aftercooler causes air to be directed longitudinally along the length of the aftercooler. It should be noted that the top wall 28 of the aftercooler housing is inclined from the inlet end wall 36 to the remaining end wall 38, and as indicated by the arrows at FIG. 3, this inclined top wall causes incoming air to be redirected downwardly toward the aftercooler core 44 where the air is cooled by passing in heat exchange relationship to the fins 60. Thus the inclined top wall 28 not only operates to streamline and reduce the profile of the aftercooler 22, but this wall also acts as a deflector to distribute incoming air downwardly over the aftercooler core.

After the air has been cooled by the aftercooler assembly 44, it passes into the lower outlet chamber 48 of the aftercooler and then out through opening 66 in the wall 34 of the aftercooler housing. These openings 66 are aligned with engine intake ports 68 in the engine 10 which admit air to the engine cylinders for subsequent mixing with fuel and combustion. Thus the outlet chamber 48 serves as an intake manifold for the cooled, compressed air which is provided to the engine 10.

Generally, the housing of an aftercooler is formed from cast metal sections, such as die cast aluminum, which results in a housing which is both space consuming, expensive, and bulky. This cast housing has been required to provide the strength necessary to contain the pressurized air passing through the aftercooler. In accordance with the present invention, a strong, efficient aftercooler assembly is provided which is smaller in size and yet compares in performance with much larger aftercooler units. To achieve this, the aftercooler housing 26 is formed primarily of fabricated sheet material rather than of die cast metal. This sheet material will, for purposes of description, be referred to hereinafter as metal sheet material, since sheet steel, aluminum or other suitable metal sheets would commonly be used to form the housing 26. However, due to the housing reinforcing structure of this invention, it is conceivable that sheet material of plastic, fiberglass or other suitable nonmetallic materials could be fabricated to form the housing 26. The sheet material is fabricated to form a wrapper which encloses the aftercooler core 44. As illustrated in FIG. 4, sheet metal may be fabricated to form an open ended wrapper including the bottom wall 42, the inclined wall 40, the outer side wall 32, the top wall 28, and the inner rear side wall 34. To complete the wrapper, the bottom wall 42 is welded to the inner wall 34 at a lap joint 70. Obviously, other suitable means may be employed to secure the bottom and back walls of the aftercooler housing.

It will be noted from FIG. 4 that the sheet metal wrapper which constitutes the major portion of the aftercooler housing 26 is fabricated so that the width W thereof closely approximates the width of the aftercooler core 44. This permits the core to be used as a reinforcing element for the sheet metal wrapper so that the strength of the core will permit the wrapper to withstand internal air pressure without buckling. This is accomplished by using cross tie assemblies 72 to draw the sheet metal wrapper in against the aftercooler core assembly 44 to form a unitized sandwich construction. This enables the support plates 58 or other support structures within the aftercooler core, such as side support plates to reinforce the outer and inner sidewalls 32 and 34 of the aftercooler housing.

To reduce the load carrying requirement of the sheet metal wrapper, reinforcing sections are provided on one of the sidewalls 32 or 34. In FIGS. 4 and 5, these reinforcing sections are formed by metal stiffening plates 74 welded or otherwise secured to the exterior surface of the inner wall 34. These stiffening plates will extend between the inner wall and the engine 10 when the aftercooler assembly is mounted upon the engine, and each stiffening plate is provided with the opening 66 to permit air from the aftercooler assembly to be introduced into the engine chamber. The cross tie assemblies 72 transfer some of the load experienced by the sheet metal walls of the aftercooler housing 26 to the stiffening plates 74 to thereby reduce the load carrying requirement of the housing walls. Each cross tie assembly includes a hollow frame member 76 which extends between the sidewalls 32 and 34 and serves as a spacer means that limits the extent to which the sidewalls may be drawn together. A cross bolt 78 passes through the sidewall 32, the frame member 76 and the sidewall 34 and is threaded into the stiffening plate 74. As illustrated by the lower cross bolts 78 in FIG. 4, the mounting bolts for the aftercooler assembly 22 which extend into the engine 10 are also provided by cross bolts 78 which extend through the stiffening plates 74.

The cross tie assembly 72 has been shown with cross bolts 78 in FIG. 4, but rivets or other cross tie members could be used to draw the sidewalls 32 and 34 together while transferring some of the load on the sidewalls to the reinforcing sections formed by plates 74.

As shown in FIG. 3, end support plates 58 for the aftercooler core assembly 44 may be secured to the forward and aft headers 50 and 52, and, as illustrated in FIG. 4, other support plates 58 may be secured to or made unitary with the hollow frame 76 of cross tie assemblies 72. Thus the core assembly is supported within the housing 26 in a manner which will permit limited movement of the assembly to compensate for the effects of heat expansion and pressure.

If the support plates 58 of the core assembly are replaced by side support plates as previously indicated, then the hollow frame members 76 would be positioned between the side support plates, and the bolts 78 would pass through the housing sidewalls, the side support plates and the frame members to draw the housing sidewalls against the core assembly.

Once the core assembly 44 and the headers 50 and 52 are in place, the end walls 36 and 38 may be welded or otherwise secured over the open ends of the wrapper to complete the enclosed aftercooler housing 26.

INDUSTRIAL APPLICABILITY

The aftercooler assembly 22 of the present invention utilizes a fabricated, unitized cross tie construction to permit the use of fabricated sheet material in a compact housing profile. The end wall air inlet feature combined with the tapered air inlet chamber permits air to be evenly distributed along the length of the aftercooler core without the requirement for air distribution vanes and with minimal restriction to air flow. Thus, the aftercooler assembly of the present invention operates effectively to cool the pressurized air from a turbocharger in a much smaller and often lighter housing than previously required, providing an aftercooler assembly having greatly reduced manufacturing costs and a high degree of dependability.

What is claimed is:

1. An aftercooler assembly for an internal combustion engine designed to receive compressed charge air at or below a predetermined upper pressure limit for exchange with a fluid coolant comprising:
   (a) a housing defining an elongated chamber including:
      (1) a wrapper fabricated from sheet material and being incapable of resisting said upper pressure limit of charge air pressure by itself, said wrapper including opposed spaced side-walls, and (2) an end wall at each of opposite ends of said wrapper;

(b) an elogated aftercooler core means positioned in said chamber for causing the engine charge air to flow in heat exchange relationship with the fluid coolant; and (c) a plurality of cross tie assemblies extending across the entire distance separating said first and second sidewalls and including spacer means of a length less than or equal to the width of the core means and (d) a cross tie securing means extending entirely through said housing, said spacer means and securing means cooperating in a manner drawing said first and second sidewalls into compressive engagement with said core means to form a unitized assembly capable of withstanding the upper limit of charge air pressure.

2. An aftercooler assembly for heat exchange with a fluid coolant for an internal combustion engine comprising:

a housing defining an elongated chamber adapted to be positioned adjacent the intake ports of the internal combustion engine said housing having a pair of opposed sidewalls, an elongated aftercooler core positioned in said chamber between said pair of opposed sidewalls for causing the charge air and fluid coolant to pass in heat exchange relationship, reinforcing means for stiffening portions of said housing adjacent the engine intake ports, said reinforcing means including a plurality of stiffening elements each of which extends from a location at a height below a bottom side of the core to a location at a height above a top side of the core and which are located outside of said housing adjacent one of said sidewalls, so that, upon attachment of the aftercooler assembly to an internal combustion engine, the element will contact the engine, and cross tie means comprising spacing means of a length equal to or less than the width of the core means and securing means cooperating with the spacing means for drawing said sidewalls into compressive engagement with said aftercooler core means.

3. The aftercooler assembly of claim 2 wherein said reinforcing means includes a plurality of metal stiffening plates extending between the inner wall of said housing and the engine when the aftercooler assembly is mounted upon the engine.

4. The aftercooler assembly of claim 2 wherein said reinforcing means includes a plurality of metal stiffening plates extending between the inner wall of said housing and the engine, each of said stiffening plates having an opening to permit air from the aftercooler assembly to be introduced into the engine chamber.

* * * * *